United States Patent [19]
Orino

[11] Patent Number: 5,689,354
[45] Date of Patent: Nov. 18, 1997

[54] OPTICAL SPACE COMMUNICATION APPARATUS

[75] Inventor: Kanjo Orino, Tokyo, Japan

[73] Assignee: Canon Kabushiki Kaisha, Tokyo, Japan

[21] Appl. No.: 727,214

[22] Filed: Oct. 8, 1996

Related U.S. Application Data

[63] Continuation of Ser. No. 383,325, Feb. 3, 1995, abandoned.

[30] Foreign Application Priority Data

Feb. 4, 1994 [JP] Japan ............................ 6-032031

[51] Int. Cl.⁶ .................................................. H04B 10/00
[52] U.S. Cl. ......................... 359/172; 359/152; 359/159; 359/168
[58] Field of Search ................................. 319/143, 152, 319/159, 168–170, 172

[56] References Cited

U.S. PATENT DOCUMENTS 5,329,395  7/1994  Endo et al. ............................. 359/159
5,367,398  11/1994  Ito et al. ................................. 359/159

FOREIGN PATENT DOCUMENTS 0275673    7/1988   European Pat. Off. .
59-017523  1/1984   Japan .
404122     10/1992  Japan .
WO91/05414 4/1991   WIPO .

*Primary Examiner*—Kinfe-Michael Negash
*Attorney, Agent, or Firm*—Fitzpatrick, Cella, Harper & Scinto

[57] ABSTRACT

An optical space communication apparatus includes a light-emitting device for emitting an elliptic light beam, and a light-projecting optical system for converting the elliptic light beam into a transmission light beam. The light-projecting optical system shapes a cross section of the transmission light beam into an elliptic shape immediately after having left the light-projecting optical system and also shapes the cross section of the transmission light beam into a nearly circular shape at a receiving point being located at the farthest distance in a transmissible distance range.

14 Claims, 7 Drawing Sheets

OPTICAL SPACE COMMUNICATION APPARATUS

This application is a continuation, of application Ser. No. 08/383,325 filed Feb. 3, 1995, now abandoned.

BACKGROUND OF THE INVENTION

1. Field of the Invention

The present invention relates to an optical space communication apparatus for performing communication through propagation of a light beam in a free space.

2. Related Background Art

FIG. 1 is a structural drawing of a conventional optical space communication apparatus, which is arranged to correct an alignment offset of a communication optical axis, wherein there are lenses 1, 2 and a movable mirror 3 arranged on an optical path from a partner apparatus and wherein there are a polarization beam splitter 4, a partial reflection mirror 5, a lens 6, and a light-receiving device 7 arranged in order on the reflection side of the movable mirror 3. The movable mirror 3 is engaged with a gimbal mechanism 8 so as to be rotatable as shown in a partial, structural drawing of FIG. 2, and further, the gimbal mechanism 8 is engaged with a stationary member 9, for example with a barrel body, so as to be rotatable, whereby the movable mirror 3 is rotatable about the two orthogonal axes.

On the reflection side of the polarization beam splitter 4 a laser diode 11 is set through a lens 10, and on the reflection side of the partial reflection mirror 5 a position detector 13 such as CCD or a sectional sensor is set through a lens 12. Further, an output of the position detector 13 is connected through a signal processing circuit 14 to a drive circuit 15, and an output of the drive circuit 15 is connected to an actuator 16 for driving the movable mirror 3 and to an actuator 17 for driving the gimbal mechanism 8 as shown in FIG. 2.

Transmission in optical space communication is effected while the movable mirror 3 reflects a light beam emitted from the laser diode 11; reception is effected while the light-receiving device 7 receives a light beam from the partner apparatus via the movable mirror 3. With a change in posture of the apparatus, the position detector 13 detects an amount of the posture change and the actuators 16, 17 drive the movable mirror 3, thereby correcting an emission direction of the transmission beam or a spot position of the receiving beam on the surface of the light-receiving device 7.

The optical space communication apparatus as shown in FIG. 1, having the light-emitting means, for example the laser diode, for emitting an elliptic beam and the light-projecting optical system for converting the light beam from the light-emitting means into a transmission light beam, had a drawback because fluctuations of the apparatus or disturbance of the atmosphere in the transmission space caused the transmission light beam to deviate from the receiving lens so as to disable communication. In order to perform communication without this problem, the light-projecting optical system is set so that the transmission light beam is emitted in a relatively gently divergent state and thus is received as a light beam with some spread at a receiving point.

FIG. 3 shows cross sections of the transmission light beam at respective points in the transmission space together with the conventional optical space communication apparatus, which is composed of the laser diode 11 and an optical system 20 as the light-projecting optical system. Here, the optical system 20 is an assembly of the lens 10, polarization beam splitter 4, movable mirror 3, lens 2, and lens 1 as shown in FIG. 1. Each of the lens 10, lens 2, and lens 1 is a spherical lens. The lens 2 and lens 1 have a function to convert a fine beam into a thick beam or to convert a thick beam into a fine beam. Then an elliptic beam is outgoing in a relatively gently divergent state from the optical system 20. The laser light emitted from the laser diode 11 has an elliptic cross section at a point A immediately after emission. The laser diode 11 or the optical system 20 is set to be movable in directions along the optical axis so that the laser light outgoing from the optical system 20 may have an optimum spread of the elliptic beam at a point D being the receiving point. In this case, the elliptic beam cross section at a point B immediately after having left the optical system 20 is maintained with a ratio of the major axis to the minor axis kept approximately constant at all points farther than the point B thereafter.

With optical space communication apparatus of a relatively long transmission distance, if a quantity of received light is intended to be maintained over a certain level even at a receiving point in use on the far distance side, a communicable range of beam exit angle of the transmission light generally tends to have a smaller margin as compared with an angular range of fluctuations of the beam caused by the fluctuations of the apparatus or the disturbance of the atmosphere.

Since all directions must be taken into account for directions of occurrence of beam fluctuations, a range of spread of the transmission beam ensured on communication is limited to a length along the minor axis, of a circle represented by the dotted line shown at the point D being the receiving point in FIG. 3. It thus raises a problem that a remaining part in the direction of the major axis longer than the minor axis cannot be utilized for communication.

In use for near distances, the transmission light beam is expanded in beam diameter to avoid an excessive quantity of received light on the receiving apparatus side, so that angles of transmission directivity representing the range of beam exit angle in which the transmission light beam can pass are given a relatively wide margin as compared with the angles of beam fluctuations caused by the fluctuations of apparatus or the disturbance of the atmosphere. In contrast, in use for far distances, if the quantity of received light at the receiving point is intended to be maintained above the predetermined level, the angles of transmission directivity have little margin as compared with the angles of beam fluctuations.

Therefore, the cross section of the transmission light beam may be the non-shaped ellipse in use for near distances, but the beam must be kept not away from the light-receiving portion of the receiving apparatus even with fluctuations thereof in either direction in use for far distances. For that purpose, there are generally considered beam shaping methods using cylindrical lenses, toric lenses, or prisms to shape the cross section of a beam leaving the light-projecting optical system into a circular shape at all points.

However, the above beam shaping methods, which use the cylindrical lenses or toric lenses to make the cross section of beam circular at all points after emitted, require at least two cylindrical lenses or toric lenses, causing problems of an increase in costs and a decrease in degrees of freedom on design.

SUMMARY OF THE INVENTION

An object of the present invention is to provide an optical space communication apparatus which can effectively utilize the transmission light beam while shaping the beam cross section as to be nearly circular at the receiving point, thus solving the above problems.

An optical space communication apparatus according to the present invention for achieving the above object includes a light-emitting device for emitting an elliptic beam and a light-projecting optical system for converting the elliptic beam into a transmission light beam, wherein immediately after having left said light-projecting optical system, a cross section of the transmission light beam becomes elliptic and wherein a cross section of the transmission light beam becomes nearly circular at a receiving point located at a farthest distance in a transmissible distance range.

DETAILED DESCRIPTION OF THE PREFERRED EMBODIMENTS

The optical space communication apparatus of the present invention will be described in detail in the following.

Figure 1:
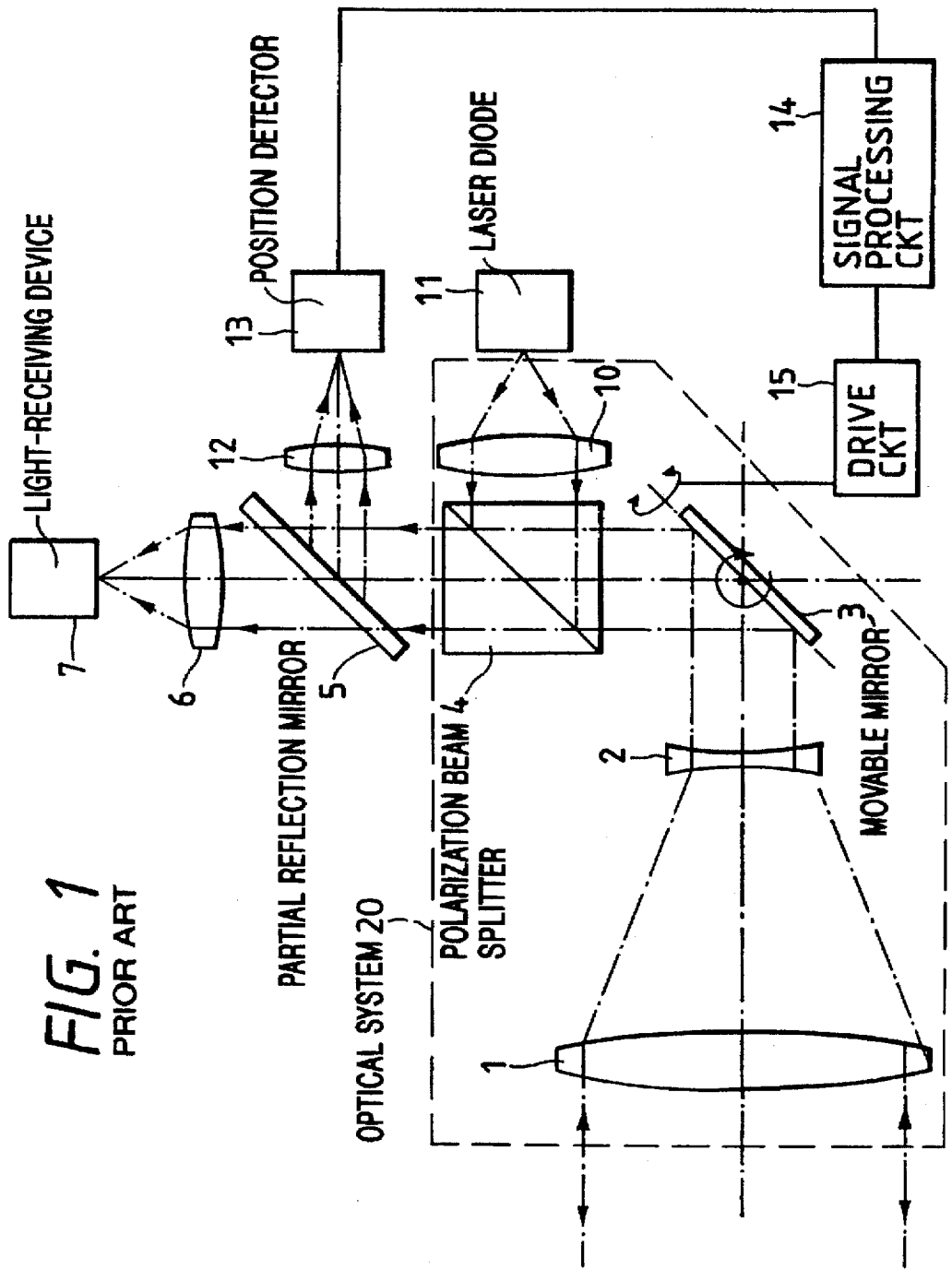
FIG. 1 is a structural drawing of a conventional optical space communication apparatus.
Figure 2:
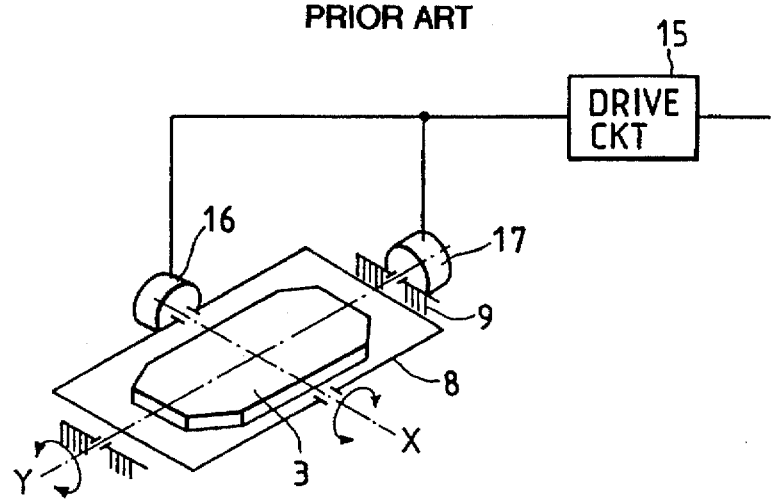
FIG. 2 is a perspective view of a movable mirror.
Figure 4:
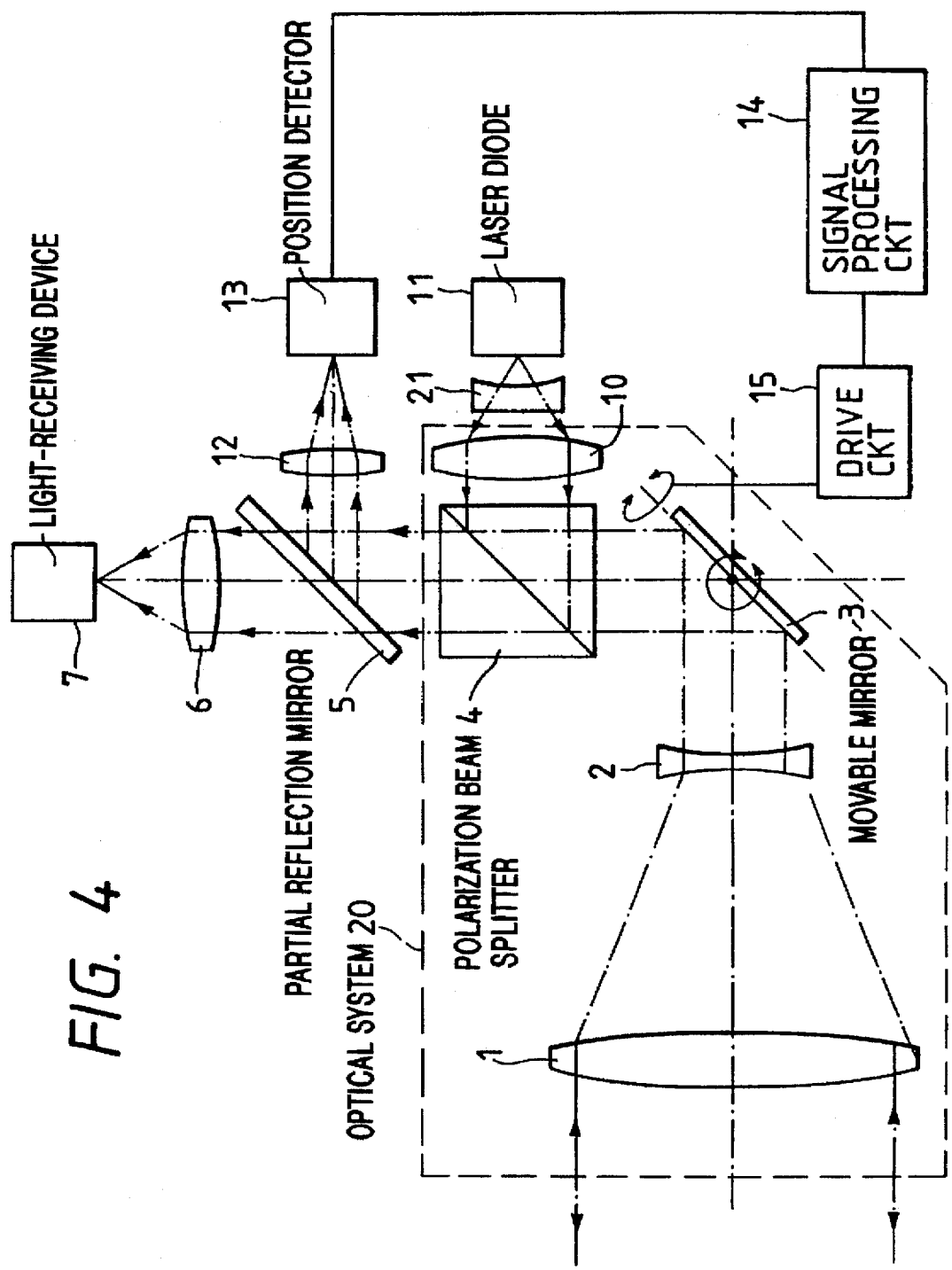
FIG. 4 is a structural drawing of the first embodiment of the optical space communication apparatus according to the present invention.

FIG. 4 is a drawing to show the whole structure of the first embodiment of the optical space communication apparatus according to the present invention. The same reference numerals as those in the apparatus of FIG. 1 denote the same members, accordingly, an explanation thereof will be omitted herein.

In the optical space communication apparatus of the first embodiment of the present invention, the light-projecting optical system is composed of a cylindrical lens 21 and the optical system 20. The optical system 20 is an assembly of the lens 10, the polarization beam splitter 4, the movable mirror 3, the lens 2, and the lens 1, as shown in FIG. 4.

The cylindrical lens 21 has a lens surface (cylindrical surface) having different curvatures in two directions perpendicular to each other, on the laser diode 11 side.

Figure 5:
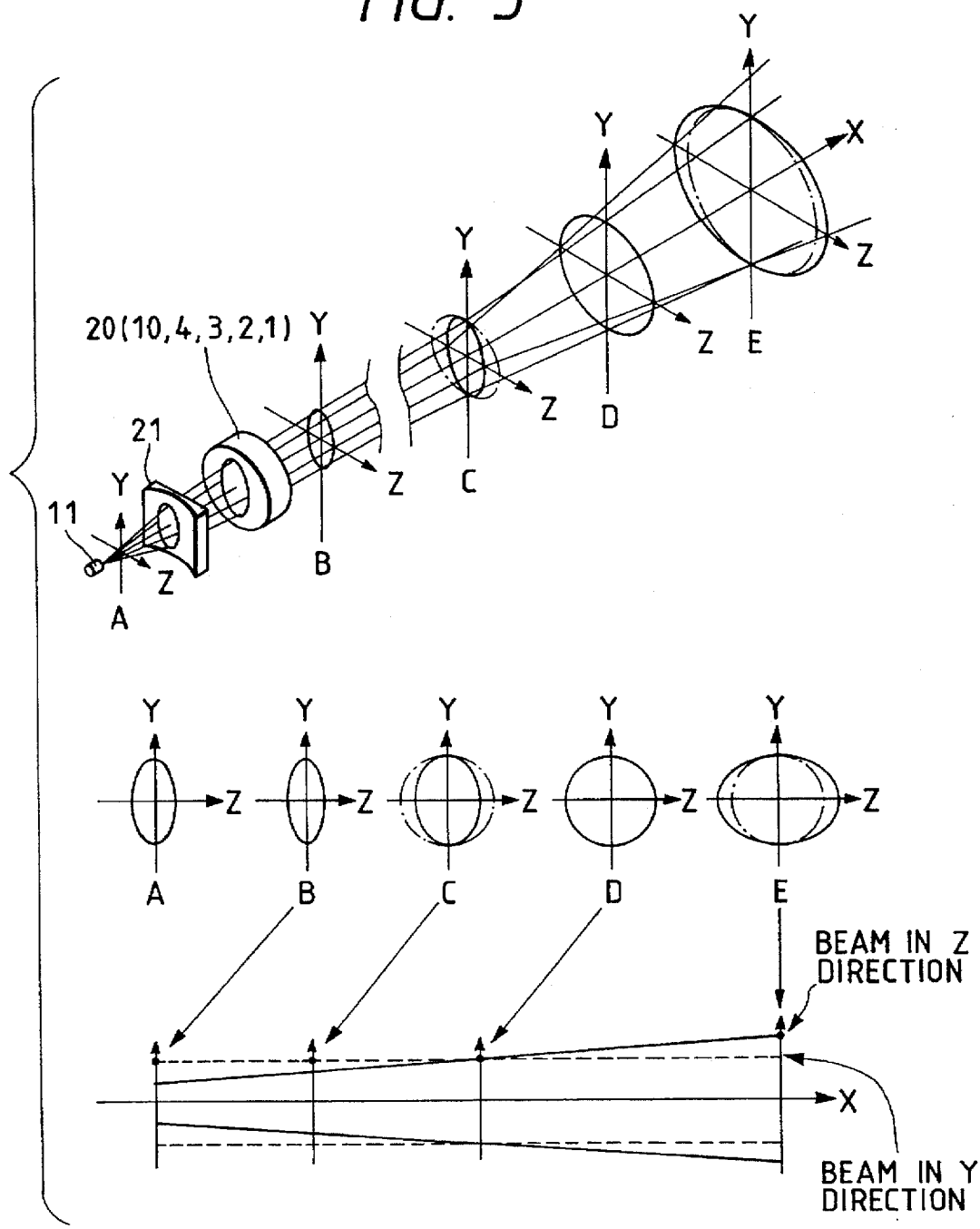
FIG. 5 is an explanatory drawing to show the optical space communication apparatus and cross sections of the transmission beam in the first embodiment of the present invention.

FIG. 5 shows the optical space communication apparatus and changes of cross section of the transmission light beam in the first embodiment of the present invention, and this apparatus is composed of the laser diode 11, the cylindrical lens 21, and the optical system 20.

Figure 3:
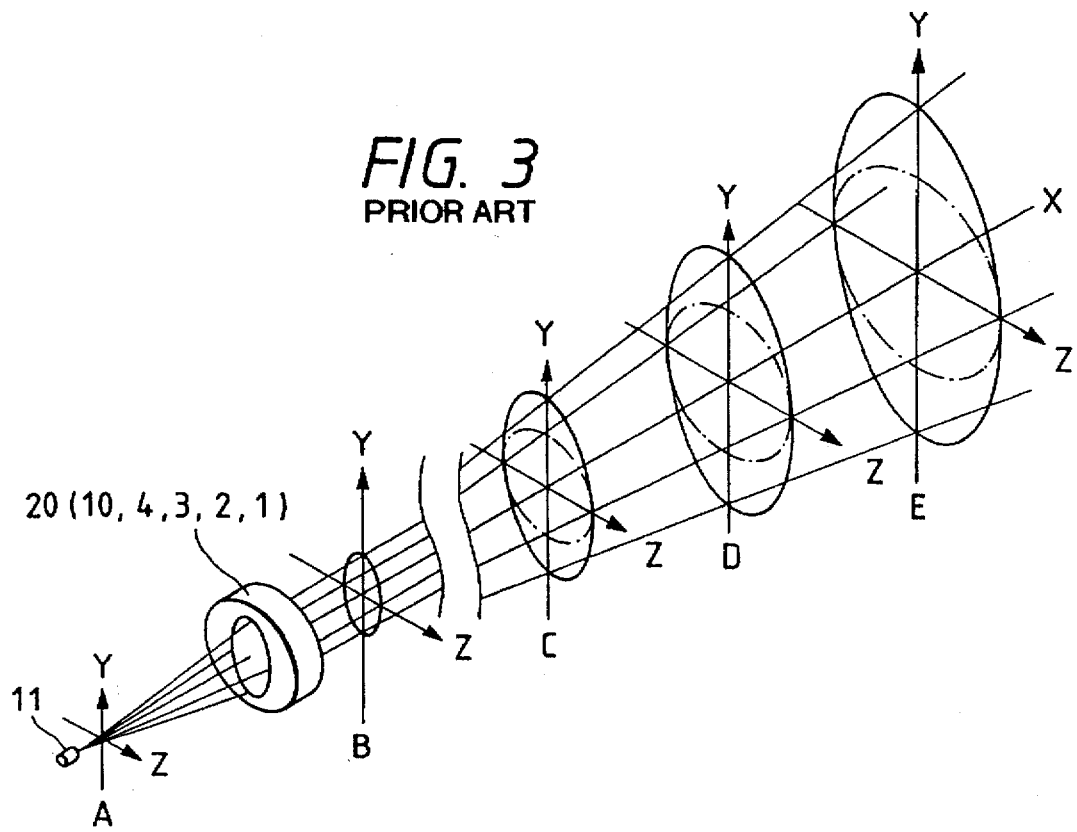
FIG. 3 is an explanatory drawing to show the conventional optical space communication apparatus and cross sections of the transmission beam.

The laser beam from the laser diode 11 is emitted with a cross section thereof being elliptic at the point A, and is incident through the cylindrical lens 21 with relatively gentle curvatures into the optical system 20 to be projected into the transmission space. The cross section of the beam at the point B immediately after having left the optical system 20 is still elliptic with little change of its aspect ratio, as being the case in the conventional example, shown in FIG. 3, without the cylindrical lens 21.

Suppose, out of the point C to the point E farther than the point B, the point D is the farthest point in the transmissible distance range of the optical space communication apparatus. In order to shape the cross section of the transmission beam into a circle of predetermined dimensions at the point D, a spread of the beam is set in an optimum state by moving the laser diode 11, the cylindrical lens 21, or the optical system 20 along the optical axis and the Z-directional curvature of the cylindrical lens 21 is set so that when the length in the direction of the major axis at the point D is set to a necessary length, the length in the direction of the minor axis is also set to the same length thereat.

As so arranged, the cross section of the beam becomes nearly circular at the point D, and the cross section is of an ellipse close to a circle at the point C and at the point E before and after the point D. Accordingly, in use in the far range, where little margin was given in the angles of transmission directivity in the conventional case, the cross section of the transmission beam becomes nearly circular so as to utilize the beam without waste.

The chain lines in FIG. 5 to show the cross sections of the beam at the point C and at the point E in the upper region of FIG. 5 are circles with the diameter being the major axis of the beam immediately after having left the optical system 20. Further, illustrations of cross sections of the beam at the five points of from the point A to the point E shown in the middle region of FIG. 5 are drawn so that lengths along the Y axis become nearly equal to each other, in order to facilitate understanding of degrees of distortion from a circle.

The lower part of FIG. 5 shows the states of the spread of the beam after having left the optical system 20. The solid lines in the drawing show a diverging state of beam in the Z direction, and the dotted lines a diverging state of beam in the Y direction.

Before and after the point D, the relations between the diverging states of beam in the Y direction and in the Z direction are inverted, so that the elliptic beam at the point E is inverted in the directions of the major and minor axes with respect to that at the point C.

The first embodiment showed an example in which the cylindrical lens 21 had a concave surface on the laser diode 11 side, but the same effects can be achieved using a cylindrical lens having a concave surface on the opposite side. Further, such a cylindrical lens may be set in the optical system 20, or an optical element presenting a cylindrical surface or a toric surface of a concave shape may be used as one surface of the spherical lens 10 being a constituent of the optical system 20, thereby achieving the same effects as in the first embodiment.

As shown in FIG. 5, the laser beam from the laser diode 11 is emitted with the cross section thereof being elliptic at the point A and passes through the cylindrical lens 21 to be projected from the optical system 20. The beam also has the same elliptic shape at the point B immediately after projected, and the laser diode 11, the cylindrical lens 21, or the optical system 20 is arranged as movable along the optical axis so that the beam cross section is shaped substantially in a circular shape at the point D being the farthest transmissible distance. Further, the Z-directional curvature of the cylindrical lens 21 is properly set according to the transmissible distance.

Figure 6:
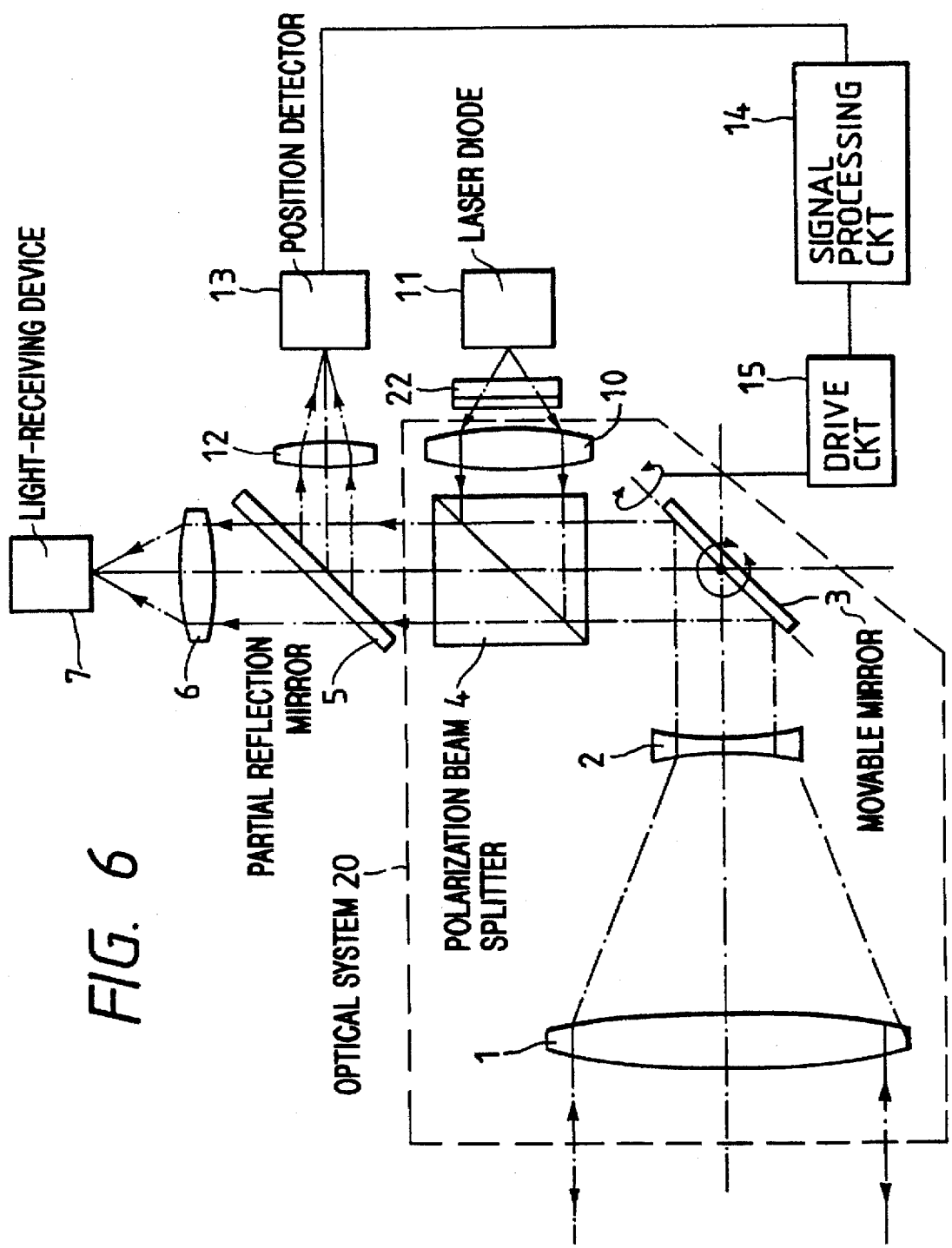
FIG. 6 is a structural drawing to show the second embodiment of the optical space communication apparatus according to the present invention.

FIG. 6 is a drawing to show the whole structure of the second embodiment of the optical space communication apparatus according to the present invention. The same reference numerals as those in the apparatus of FIG. 4 denote the same members, accordingly, an explanation thereof will be omitted herein.

Figure 7:
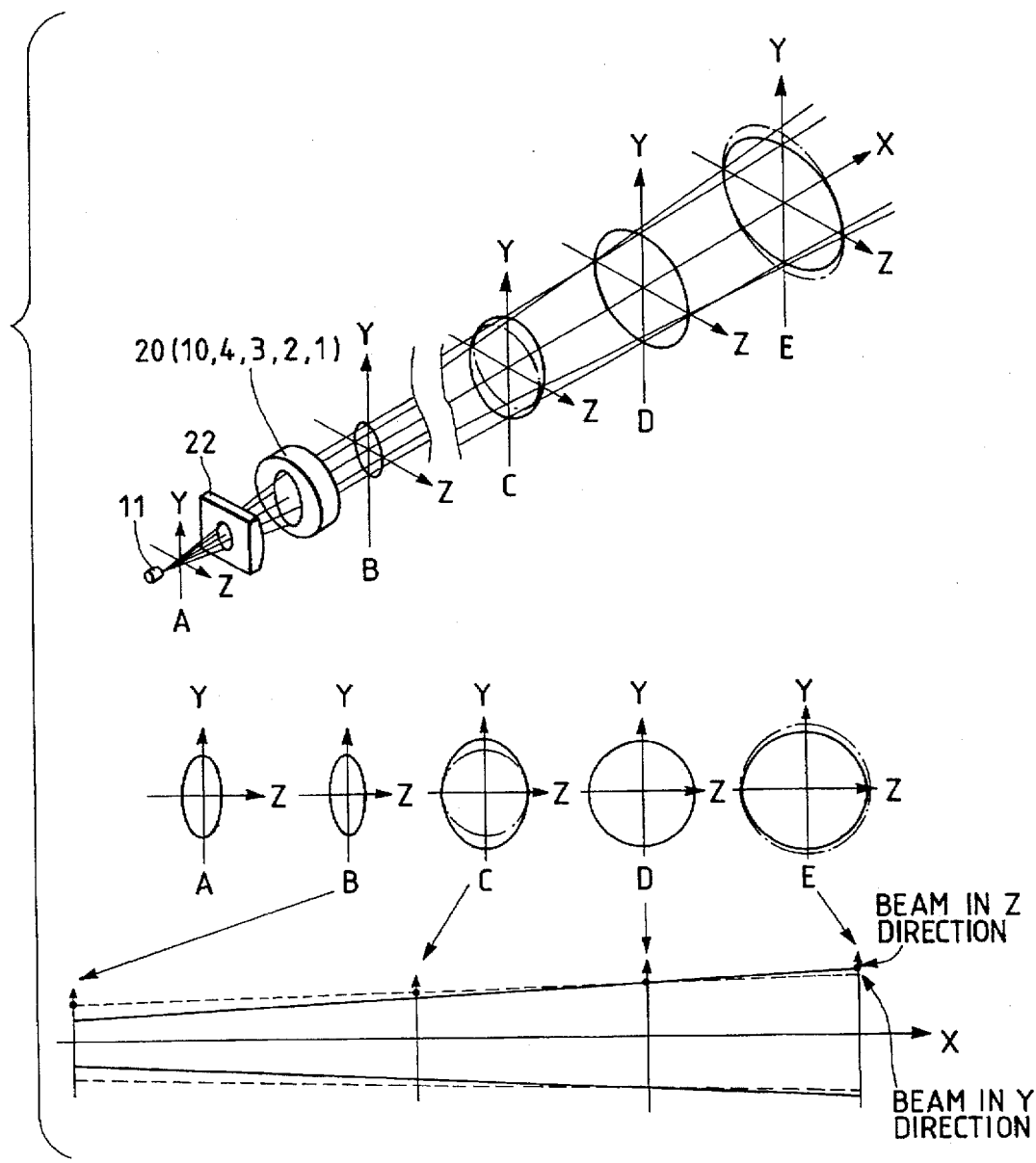
FIG. 7 is an explanatory drawing to show the optical space communication apparatus and cross sections of the transmission beam in the second embodiment of the present invention.

FIG. 7 shows the optical space communication apparatus and changes of the shape of the transmission light beam in the second embodiment of the present invention. Instead of using the cylindrical lens 21 having the concave cylindrical surface in the first embodiment, a cylindrical lens 22 having a convex cylindrical surface is used as an optical element for shaping the beam, and the other constituents are the same as those in the first embodiment. The cylindrical lens 22 has a lens surface (cylindrical surface) having different curvatures in two directions perpendicular to each other, on the spherical lens 10 side.

The cross sections of the beam up to the point B immediately after having left the optical system 20 are elliptic with its aspect ratio nearly equal to that in the case without the cylindrical lens 22, but the cylindrical lens 22 shapes the beam so that an angle of divergence in the direction of the major axis (or in the direction of the Y axis) is a little smaller than that in the direction of the minor axis (or in the direction of the Z axis) after the point B, but also shapes the cross section as to be nearly circular in the far distance range of from the point C to the point E wherein the cross section becomes nearly circular at the point D, which is the same as in the first embodiment as described above.

Namely, supposing the point D is the farthest point in the transmissible distance range of the optical space communication apparatus, in order to shape the cross section of the transmission light beam at the point D as to be a circle having a necessary size, the spread of the beam is set in an optimum state by moving the laser diode 11, cylindrical lens 22, or optical system 20 in the direction of the optical axis, and further, the Y-directional curvature of the cylindrical lens 22 is set so that when the minor axis at the point D is set to a necessary length, the major axis may have the same length. By this, a region of nearly circular cross sections is formed in use in the far distance side, where the angles of transmission directivity used to have little margin, whereby the transmission light beam can be utilized without waste.

The second embodiment showed an example in which the cylindrical lens 22 had the convex surface on the optical system 20 side, but a cylindrical lens having a convex surface on the opposite side may be used similarly as in the first embodiment. Such a cylindrical lens may be set in the optical system 20, or an optical element to become a cylindrical surface or a toric surface of a convex shape may be used as one surface of the spherical lens 10 being a constituent of the optical system 20, thereby achieving the same effects.

The optical space communication apparatus as described above in the first and second embodiments each comprise the light-emitting means for emitting an elliptic beam and the light-projecting optical system for converting the elliptic beam into a transmission light beam, wherein a lens surface having different curvatures in two orthogonal directions is set on an arbitrary surface in the light-projecting optical system, whereby the cross section of the transmission light beam at the receiving point can be shaped as to be nearly circular in use on the far distance side in the transmissible distance range.

The optical space communication apparatus as described in the above first and second embodiments are constructed in the following structure.

The each apparatus comprises the light-emitting means (11) for emitting the elliptic light beam and the light-projecting optical system (21, 22, 10, 4, 3, 2, 1) for converting the elliptic light beam into the transmission light beam, wherein the light-projecting optical system shapes the cross section of the transmission light beam to be elliptic immediately after having left the light-projecting optical system and also shapes the cross section of the transmission light beam to be circular at the receiving point (point D) being the farthest point in the transmissible distance range.

Further, the optical communication apparatus as described in the above first and second embodiments are constructed in the following structure.

The each apparatus comprises the receiving optical system (1, 2, 3, 4, 5, 6, 7, 12, 13) for receiving a first transmission light beam from a partner apparatus, and the transmission optical system (11, 21, 22, 10, 4, 3, 2, 1) for transmitting a second transmission light beam to the partner apparatus, wherein the transmission optical system comprises the optical element (21, 22) having a lens surface with different curvatures in two directions perpendicular to each other, on an arbitrary surface, and the optical element is set in an optical path separated from an optical path of the receiving optical system.

The above structures permit the beam spread states to be set by moving the cylindrical lens 21, 22 in the direction of the optical axis of the spherical lens 10, without affecting the receiving optical system.

Figure 8:
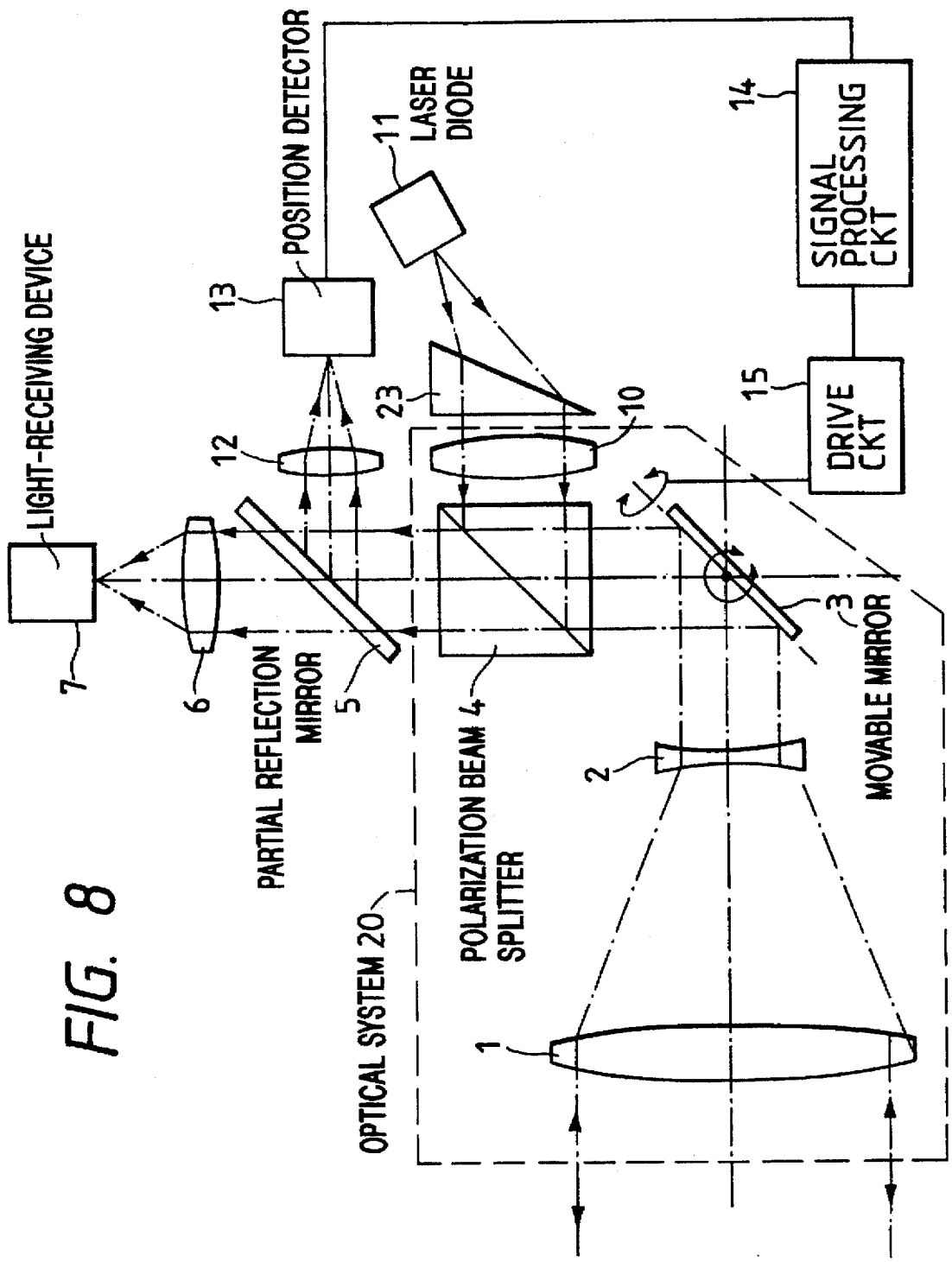
FIG. 8 is a structural drawing to show the third embodiment of the optical space communication apparatus according to the present invention.

FIG. 8 is a drawing to show the whole structure of the third embodiment of the optical space communication apparatus according to the present invention. The same reference numerals as those in the apparatus of FIG. 4 denote the same members, accordingly, an explanation thereof will be omitted herein.

The third embodiment is constructed in the same structure as the first embodiment except that a prism 23 is used as a beam shaping optical element instead of the cylindrical lens 21 having the concave cylindrical surface.

The third embodiment is arranged to use the prism 23 whereby the beam after it is emitted has different spread conditions in two directions perpendicular to each other, and divergent states of the beam in the two directions are inverted between before and after the point D, which is the farthest distance in the transmissible range.

The optical space communication apparatus as described above in the third embodiment has the following structure.

The apparatus includes the light-emitting device 11 for emitting an elliptic light beam and the light-projecting optical system (23, 10, 4, 3, 2, 1) for converting the elliptic light beam into a transmission light beam, wherein the light-projecting optical system shapes the cross section of the transmission light beam into an elliptic shape immediately after having left the light-projecting optical system and also shapes the cross section of the transmission light beam into a nearly circular shape at the receiving point (point D) being the farthest distance in the transmissible distance range.

Further, the optical space communication apparatus as described above in the third embodiment has the following structure.

The apparatus includes the receiving optical system (1, 2, 3, 4, 5, 6, 7, 12, 13) for receiving a first transmission light beam from a partner apparatus and the transmission optical system (11, 23, 10, 4, 3, 2, 1) for transmitting a second transmission light beam to the partner apparatus, wherein the transmission optical system comprises the prism 23, which is set in an optical path separated from that of the receiving optical system.

The above structures permit the spread conditions of beam to be set by moving the prism along the optical axis of the spherical lens 10, without affecting the receiving optical system.

As described above, the optical space communication apparatus according to the present invention comprise the light-emitting means for emitting an elliptic beam and the light-projecting optical system for converting the elliptic beam into a transmission light beam, wherein the cross section of the transmission light beam is shaped into an elliptic shape immediately after having left the light-projecting optical system and the cross section of the transmission light beam is shaped into a nearly circular shape at a receiving point which is the farthest distance in the transmissible distance range, so that the transmission light beam is shaped in a nearly circular cross section at the receiving point, thereby effectively utilizing the transmission light beam.

As described above, the optical space communication apparatus according to the present invention includes the light-emitting device for emitting an elliptic beam and the light-projecting optical system for converting the elliptic beam into a transmission light beam, wherein the cross section of the transmission light beam at the receiving point is shaped into a nearly circular shape by providing a lens surface having different curvatures in two orthogonal directions at an arbitrary surface in the light-projecting optical system or by providing a prism in the light-projecting optical system, whereby the transmission light beam can be effectively utilized. Therefore, when they are applied to the conventional apparatus, the transmissible distance range can be extended on the far distance side.

What is claimed is:

1. An optical space communication apparatus comprising:
   light-emitting means for emitting an elliptic light beam; and
   a light-projecting optical system for converting the elliptic light beam emitted by said light-emitting means into a transmission light beam, said light-projecting optical system comprising a plurality of optical elements, said system shaping a cross section of said transmission light beam into an elliptic shape immediately after having left said light-projecting optical system, and shaping the cross section of said transmission light beam at a farthest distance in a transmissible distance range such that a first width of said cross section along a first axis is substantially the same as a second width of said cross section along a second axis that is perpendicular to said first axis.

2. An optical space communication apparatus according to claim 1, wherein said light-emitting means is a laser diode.

3. An optical space communication apparatus according to claim 1, wherein said light-projecting optical system comprises a lens surface having different curvatures in two directions perpendicular to each other, as an arbitrary surface.

4. An optical space communication apparatus according to claim 3, wherein said lens surface is a cylindrical surface.

5. An optical space communication apparatus according to claim 3, wherein said lens surface is a toric surface.

6. An optical space communication apparatus according to claim 1, wherein said light-projecting optical system comprises a prism.

7. An optical space communication apparatus for communicating with a partner optical space communication apparatus comprising:
   a receiving optical system for receiving a first transmission of a light beam from the partner optical space communication apparatus; and
   a transmission optical system for transmitting a second transmission light beam to the partner optical space communication apparatus, said transmission optical system comprising a light-emitting element for emitting light to an optical element having a lens surface with different curvatures in two directions perpendicular to each other, as an arbitrary surface, said optical element being set in an optical path separated from an optical path of said receiving optical system,
   wherein said transmission optical system shapes a cross section of the second transmission light beam into an elliptic shape immediately after having left said transmission optical system and also shapes the cross section of the second transmission light beam into a nearly circular shape at a receiving point being located at a farthest point in a transmissible distance range.

8. An optical space communication apparatus according to claim 7, wherein said transmission optical system comprises light-emitting means for emitting an elliptic light beam.

9. An optical space communication apparatus according to claim 8, wherein said light-emitting means is a laser diode.

10. An optical space communication apparatus according to claim 7, wherein said lens surface is a cylindrical surface.

11. An optical space communication apparatus according to claim 7, wherein said lens surface is a toric surface.

12. An optical space communication apparatus for communicating with a partner optical space communication apparatus, comprising:
    a receiving optical system for receiving a first transmission light beam from the partner optical space communication apparatus; and
    a transmission optical system comprising a light-emitting element for emitting a second transmission light beam to be transmitted to the partner optical space communication apparatus, said transmission optical system further comprising a prism, said prism being set in an optical path separated from an optical path of said receiving optical system,
    wherein said transmission optical system shapes a cross section of the second transmission light beam into an elliptic shape immediately after having left said transmission optical system and also shapes the cross section of the second transmission light beam located at a farthest point in a transmissible distance range such that a first width of said cross section along a first axis is substantially the same as a second width of said cross section along a second axis that is perpendicular to said first axis.

13. An optical space communication apparatus according to claim 12, wherein said transmission optical system comprises light-emitting means for emitting an elliptic light beam.

14. An optical space communication apparatus according to claim 13, wherein said light-emitting means is a laser diode.

* * * * *

UNITED STATES PATENT AND TRADEMARK OFFICE
CERTIFICATE OF CORRECTION

PATENT NO.  : 5,689,354
DATED       : November 18, 1997
INVENTOR(S) : Orino

It is certified that error appears in the above-indentified patent and that said Letters Patent is hereby corrected as shown below:

COLUMN 2:

Line 60, "emitted" should read --emission--.

COLUMN 4:

Line 33, "of from" should read --from--; and
    Line 63, "after" should read --after being--.

COLUMN 5:

Line 28, delete "of";
    Line 43, delete "in use"; and
    Line 66, "delete "in use".

COLUMN 6:

Line 4, "The each" should read --Each--; and
    Line 17, "The each" should read --Each--.

UNITED STATES PATENT AND TRADEMARK OFFICE
CERTIFICATE OF CORRECTION

PATENT NO. : 5,689,354
DATED      : November 18, 1997
INVENTOR(S) : Orino

It is certified that error appears in the above-indentified patent and that said Letters Patent is hereby corrected as shown below:

COLUMN 7:

Line 12, "comprise" should read --comprises--.

Signed and Sealed this

Second Day of June, 1998

Attest:

BRUCE LEHMAN

Attesting Officer

Commissioner of Patents and Trademarks